DIGITAL AUTOMATIC PHASE AND FREQUENCY CONTROL SYSTEM

Filed Jan. 15, 1969 3 Sheets-Sheet 1

INVENTORS
DANA F. CRUMB
ROBERT F. HEIDECKER
BY
Sughrue, Rothwell, Mion, Zinn & Macpeak
ATTORNEYS

United States Patent Office 3,562,661

Patented Feb. 9, 1971

3,562,661

DIGITAL AUTOMATIC PHASE AND FREQUENCY CONTROL SYSTEM

Dana F. Crumb, Lyons, and Robert F. Heidecker, Longmont, Colo., assignors to International Business Machines Corporation, Armonk, N.Y., a corporation of New York Filed Jan. 15, 1969, Ser. No. 791,213

Int. Cl. H03b 3/04

U.S. Cl. 331—10 9 Claims

ABSTRACT OF THE DISCLOSURE

A phase lock loop which utilizes all digital circuits. The primary object is to synchronize the output of a clock oscillator of a synchronous data receiver with an incoming train of data pulses and more particularly to track tape velocity variations in magnetic recording systems and to produce reference clock pulses in proportion to that tape velocity. The loop consists of five basic parts: (1) the reference counter, (2) the master oscillator, (3) the phase detector, (4) the scaler, and (5) the frequency integrator. The response of this all digital phase lock loop to the input signal can simulate that of a conventional first, second, or third order analog phase lock loop.

CROSS REFERENCE TO RELATED APPLICATION

Several implementations of the scaler described herein are fully described and claimed in co-pending application, Ser. No. 792,232, filed Jan. 15, 1969, and entitled "Digital Phase Scaler" by R. F. Heidecker and assigned to the same assignee as this invention. However, this invention is not to be limited by the implementations of the scaler described and claimed therein but can embody any compatable type scaler.

BACKGROUND OF THE INVENTION

Field of the invention

The invention relates to digital clocking and synchronization for use in synchronous data receivers with incoming data signals and more particularly to an automatic phase control system for use in magnetic recording systems to produce reference clock pulses which compensate for tape velocity variations in the reading of magnetically recorded information.

Description of the prior art

Digital clocking in magnetic recording systems of the past has generally been achieved by using analog phase lock loops. However, analog phase lock loops have several inherent disadvantages and limitations. These disadvantages include the necessity for manual potentiometer adjustments and a lock-in time as long as 20 bit periods for a 20% frequency offset between the input frequency and nominal output frequency. Furthermore, the analog error signal producing devices are inherently narrow banded and comparatively unstable.

The prior art also contains oscillator disciplining systems which operate in the digital mode wherein a digital error signal is used to control the disciplined oscillators. However, these digital systems have made only frequency corrections to the disciplined oscillator and have not included phase corrections.

SUMMARY OF THE INVENTION

The invention may be summarized as a digtal clocking system employing an all digital phase lock loop to produce reference clock pulses which can very closely simulate the performance of a first, second, or third order analog phase lock loop. Furthermore, this digital clocking system will offer several advantages over prior analog phase lock loops. The digital circuits require no manual adjustment; whereas, equivalent analog circuits require two to three potentiometer adjustments. The functional packaging required for the digital clocking circuits is less than that needed for the equivalent analog circuits. The response of the digital clock can be easily varied electronically, and the lock-in time for the all digital phase lock loop can require as little as one bit period.

The all digital clocking system consists of five basic parts: (1) the reference counter, (2) the master oscillator, (3) the phase detector, (4) the scaler, and (5) the frequency integrator. The train of input data pulses is fed to the phase detector which compares the count value of the reference counter at the time each input pulse appears to a predetermined reference counter value which has been selected to trigger the output clocking pulse. The count difference is the detected phase error and is transferred with its appropriate sign to the scaler. The scaler accumulates and weights the phase error so as to produce the desired phase and frequency correction pulses. The frequency correction pulses are fed to the frequency integrator which integrates the frequency corrections and produces a frequency reference signal which in turn controls the reference counter cycle length or alternatively the frequency of the master oscillator. The phase correction pulses are fed to the reference counter and cause the reference counter to either add or subtract a count or counts from the instant cycle length, depending upon whether the detected phase error is positive or negative. The master oscillator steps the reference counter at a frequency many times that of the input signal. The reference counter initiates the output clocking pulse at some predetermined count value.

The invention may be implemented in at least two general logic design: one using only binary counters, the other using a combination of binary counters and adders. However, the implementation using counters and adders provides more design versatility.

Thus, it is an object of the invention to provide an all digital phase lock loop which provides both frequency and phase corrections to a reference clock.

Another object is to provide an all digital phase lock loop which has a loop gain or response which can be a constant, a function of the instantaneous detected phase error, a function of several previous detected phase errors, a function of some external control, or any combination of these.

Another object is to provide an all digital phase lock loop which is capable of providing several outputs which represent a single instantaneous frequency with several different phase relationships.

Another object of the invention is to provide an all digital phase lock loop which requires as little as one bit period for lock-in or acquisition.

Another object is to provide an all digital phase lock loop which requires no manual adjustments.

DESCRIPTION OF THE PREFERRED EMBODIMENTS

Figure 1:
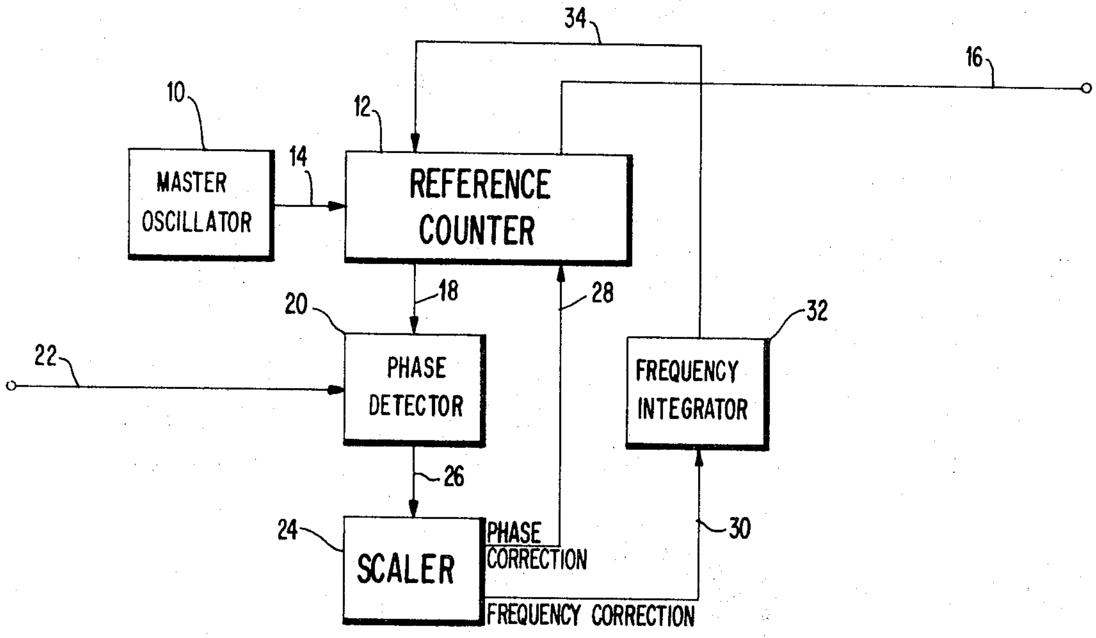
FIG. 1 is a block diagram of the basic all digital phase lock loop in which both the phase corrections and the frequency corrections control the reference counter.

FIG. 1 shows a block diagram of the basic all digital phase lock loop. The overall function of the loop is to produce output pulse signals which have a minimum average phase difference with respect to input pulse signals. The input signals, as well as the output signals, are thus a train of data pulses. When the all digital phase lock loop is used in the reading of magnetically recorded information, the input signals are the peaks of the data pulses that are read from the tape.

The five basic components of the all digital phase lock loop are interconnected as follows. A master oscillator 10 advances the count of a reference counter 12 via line 14. The reference counter initiates an output pulse signal on line 16 at some predetermined count value and also provides its intsant count value on line 18 each time an input pulse signal appears for use in the phase detector 20. The input data signals enter the loop on line 22. The output of the phase detector 20 is communicated to the scaler 24 via line 26. The scaler 24 produces phase correction pulses on line 28 which is connected directly to the reference counter. The scaler also produces frequency correction pulses on line 30 which is connected to the frequency integrator 32. The frequency integrator provides a frequency reference signal on line 34 which is connected to the reference counter and controls its cycle length.

The master oscillator 10 oscillates at a frequency which is many times that of the input signal frequency. The ratio of the two frequencies is an indication of the digital resolution of the phase lock loop. The primary function of the master oscillator is to advance the count value of the reference counter.

The reference counter 12 is the primary timing device of the all digital phase lock loop. Its count value is advanced by the master oscillator 10. It has a predetermined nominal cycle length, say 25 counts; however, this nominal cycle length can be varied within limits, say from 18 counts to 32 counts. Hence, the reference counter is described as having a variable length counting cycle. A predetermined count value of the reference counter initiates an output signal on line 16. This predetermined count value is normally fixed at the mid-point of the nominal cycle length. The reference counter is also used to provide a timing means for the measurement of the phase error between the input and output signals. Whenever an input signal appears on line 22, the instant count value of the reference counter is compared to the predetermined count value which initiates the output signal in the phase detector. The count difference represents the phase error. The reference counter also acts as an integrator for all of the phase correction pulses produced by the scaler 24 since these pulses cause the reference counter to either add or subtract a count from the instant cycle length of the reference counter. The reference counter is recycled at a rate determined by the frequency integrator 32 which varies the counter cycle length and, hence, the output frequency.

The phase detector 20 compares the count difference between the count value at the time an input data pulse appears and the count of the reference counter 12 which triggers an output signal. This comparison can be done in many conventional ways; however, the simplest type phase detection is achieved by reading the phase error directly from the reference counter 12 at the time an input signal appears. The method can be described as follows. Assign a center count or a zero phase error value to the reference counter, say 16. If the input pulse appears and the reference counter count value is less than 16, the phase error is the magnitude of the count difference and is given a negative sign. If the count at the time of the input pulse is greater than 16, the error is again the magnitude of the count difference but is now given a positive sign. In either case, the magnitude of the detected phase error with its appropriate sign is transferred to the accumulator of the scaler 24.

The function of the scaler 24 is to provide weighting to the accumulated phase errors so as to produce the desired phase and frequency corrections. Weighting is a determination of how often and at what times the accumulated phase errors are to be used in initiating the corrections to the output signals. For example, a phase shift of 4 units might be corrected at one time or one unit at a time over four cycles of the input signal. In normal operation, the phase corrections are made relatively fast; whereas, the frequency corrections are not affected until after a number of phase corrections had been made. However, this general mode of operation must be altered for certain desired responses, such as during lock-in frequency corrections should be made very rapidly.

The operation of the scaler is fully disclosed in copending application Ser. No. 792,232, filed Jan. 15, 1969, and entitled "Digital Phase Scaler;" however, the operation of the scaler will be briefly summarized here for convenience. The scaler will accumulate the detected phase errors and, at predetermined values of the accumulated phase error, will produce phase and frequency correction pulses which are communicated to the reference counter and the frequency integrator, respectively. The accumulation function can be performed by either binary counters or binary adders and their count value can be monitored by either AND decode circuits or threshold logic circuits. By varying the count values which produce the phase and frequency correction pulses, the weighting function of the scaler is changed and this will control the response of the output signal to the input signal since the time for making the phase and frequency corrections has been changed. Hence, by controlling which count values of the accumulated detected phase errors produce the phase and frequency corrections pulses, it is possible to make the corrections to the output signal a function of the instantaneous sampled phase error, the accumulated phase error, or some external control.

The frequency integrator 32 integrates all of the frequency corrections pulses on line 30 to provide a frequency reference on line 34. The frequency reference appears as a multiple bit binary number at the output of the integrator, and is used to control the output signal frequency by varying the reference counter cycle length. The frequency integrator can be one of two types or a combination of these. The most obvious is a forward-backward binary counter; however, an adder type integrator can also be used.

Only the master oscillator 10 and reference counter 12 operate continuously. All other components function only after an input signal has appeared. Therefore, the reference counter 12 requires the fastest digital logic while slower logic can usually be used to perform the other functions.

The phase and frequency corrections are produced as follows. Phase detector 20 compares the count value of the reference counter 12 at the time the input signal appears on line 22 to a predetermined reference counter value which has been set to initiate an output clock pulse. The count difference is the phase error which is transferred with its appropriate sign to the scaler 24 via line 26. The scaler 24 accumulates and weights the phase error so as to produce the desired phase correction pulses on line 28, and the desired frequency correction pulses on line 30 such that the phase and frequency difference between the input signal and output signal is reduced. The frequency integrator 32 integrates the frequency correction pulses and provides a frequency reference signal on line 34 which controls the reference counter cycle length which in turn controls the output frequency. The phase correction pulses cause the reference counter to either add or subtract counts from its instant cycle length.

The initial synchronization for lock-in can be accomplished in as little as one bit time as follows. The reference counter 12 is reset to its mid-point which is the predetermined count value which initiates the output clock pulse; the frequency integrator 32 is reset to its mid-point which represents the nominal frequency; and the accumulator of the scaler 24 is reset to zero. When the first input data pulse arrives, the reference counter 12 begins counting at the rate determined by the master oscillator 10 until the second input data pulse appears. At this time, the phase error is read from the reference counter and added directly to the frequency integrator 32 changing the frequency reference value on line 34 which varies the reference counter cycle length and hence adjusts the output frequency to that of the input signal frequency. The reference counter 12 is reset to its mid-point and the loop is now in phase with the input signal and at very nearly the same frequency. In short, rapid lock-in can be achieved by using the detected phase error between the first two data input pulses as a frequency correction which is immediately initiated.

In normal phase lock loop operation only one output signal is produced for each input signal. This output signal is initiated when the count of the reference counter 12 reaches a predetermined value, usually the mid-point of the reference counter's cycle-length. However, by initiating an output signal pulse at several different reference counter counts which are subsequently OR'ed together, the phase lock loop is capable of providing several outputs on line 16 at a single instantaneous frequency but with several different phase relationships.

Figure 2:
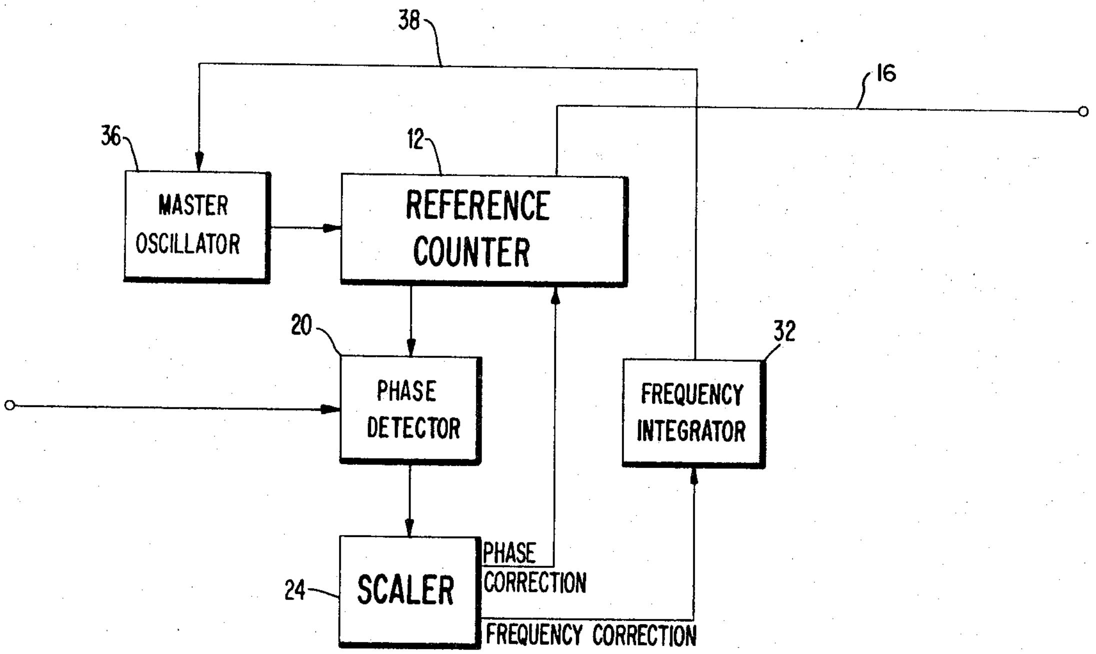
FIG. 2 is a block diagram of an alternate basic all digital phase lock loop in which the frequency corrections control the master oscillator.

FIG. 2 shows the same basic all digital phase lock loop as FIG. 1 except that the master oscillator 36 is now of a variable frequency type, such as, a voltage-controlled variable frequency oscillator which could be varied plus or minus a few percent by the frequency reference through a conventional digital-to-analog converter. The frequency reference on line 38 is now used to control the frequency of master oscillator 36 rather than the length of the cycle of reference counter 12, and this in turn will control the frequency of the output signal on line 16. Otherwise, the operation of the phase lock loops are the same. Of course, the cycle length of the reference counter need not now be variable.

The variable frequency master oscillator system offers advantages in systems where several loops operate in parallel at approximately the same frequency. In this case, the same oscillator can serve all the parallel loops as well as other machine control logic surrounding the loops. However, the variable frequency master oscillator in use with more than one loop requires that the data frequencies be nearly equal. The constant frequency master oscillator system does not have this requirement.

Figure 3:
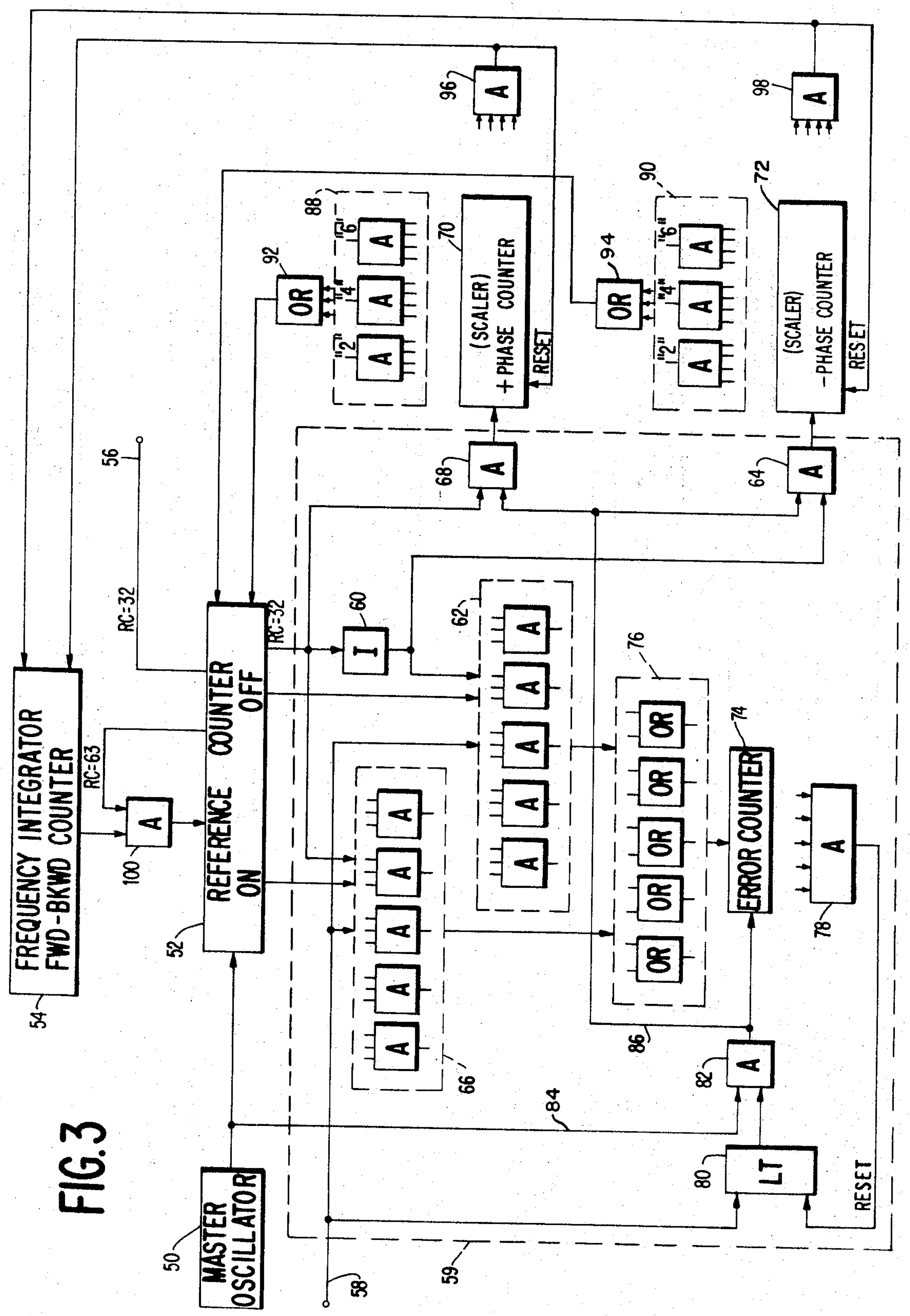
FIG. 3 is a block diagram of an all digital loop using only binary counters.

An implementation of the all digital phase lock loop using only binary counters is shown in FIG. 3. The loop operation is as follows. The constant frequency master oscillator 50 oscillates at a frequency K times the input signal frequency and advances the variable cycle-length reference counter 52. For purposes of this illustration, the cycle length has been assigned a nominal length of 57 counts and a center point of 32. Therefore, an input signal occurring at the time when the reference counter is at 32 produces a zero phase error. The reference counter consists of six binary bits and will proceed to a count of 63 and is reset to some value between 0 and 14 as determined by the output of the frequency integrator 54. The reference counter initiates an output signal pulse on line 56 each time its count reaches its center point count of 32.

The input signal pulses appear on line 58. The phase error between each input signal pulse and output signal pulse is measured by the phase detector 59 whenever an input signal appears. Phase error detection is achieved as follows. The inverter 60 is connected to the center point of the reference counter such that for counts less than the center point of 32 a positive signal appears at AND network 62 and AND gate 64, and that for counts greater than the center point of 32 positive signals appear at AND network 66 and AND gate 68. One input of each of the AND gates in AND network 66 is connected to the "on" side of one of the first five lower binary bits of the reference counter, similarly, one input of each of the AND gates in AND network 62 is connected to the "off" side of one of the first five lower binary bits of the reference counter. The third input to the AND networks 62 and 66 is the input signal. Thus, if the input signal appears at a count greater than 32 the input conditions of the appropriate AND circuits in the AND network 66 will be fulfilled. Similarly, if the input signal appears at a count less than 32, the input conditions at the appropriate AND gates in the AND network 62 will be fulfilled. The counts derived from these AND networks represent the phase error between the input signal and the output signal since the output signal always occurs at a count value of 32. However, since this phase information is in parallel form and the scalers 70 and 72 comprise binary counters and hence accept only serial binary information, this parallel count must be converted to serial form. This conversion from parallel to serial form is performed by the error counter 74. The detected phase error, whether positive or negative, is inserted into the error counter through the OR circuits 76 and will determine when the input conditions of AND gate 78 are met. For example, if the absolute value of the phase error is three, these conditions are met when the error counter's count has reached three. When the input signal appears on line 58 it triggers the latch circuit 80 into an "on" condition. Thus, the AND circuit 82 will conduct the signal received from the master oscillator on line 84 and thus advance the error counter 74. When the error counter has counted to a value of the detected phase error, the input conditions of AND gate 78 are met, the latch 80 will be reset, the AND circuit 82 will be non-conductive, and thus, the master oscillator will no longer advance the error counter. Hence, the detected phase error has been converted to a series of pulses on line 86. These pulses are inserted into either the positive phase scaler 70 or the negative phase scaler 72 depending upon whether AND gate 64 or 68 is conductive.

The detected phase error is accumulated in the appropriate binary counter of either the positive phase counter or the negative phase counter. These positive and negative phase counters with the appropriate decoding circuits perform the scaling function. A positive phase correction occurs each time the AND decode circuits 88 have an output. The inputs to the AND circuits 88 are connected to the positive phase counter such that an output will occur at a predetermined count value of the positive phase counter, for example, at counts 2, 4 and 6. Although three AND decode circuits are shown, the number can vary depending upon the desired loop response. The negative AND decode circuits 90 operate in a similar fashion. The outputs from the AND decode circuits 88 and 90 are ORed in the OR circuits 92 and 94, respectively. The outputs from these OR circuits are connected directly to the reference counter and cause the reference counter to either add or subtract a count from its instant cycle length.

The frequency correction pulses are derived from the AND circuits 96 and 98 which also decode their respective phase counters at a predetermined count value, for example, 8. An output from these AND circuits resets their respective phase counters. In addition, their output is inserted into the frequency integrator 54 which is comprised of a forward-backward counter. The frequency integrator will sum the frequency correction pulses and determine at which value the reference counter will start counting. Hence, it will determine the cycle length of the reference counter and thus the frequency of the reference output on line 56. The value in the frequency integrator is transmitted to the reference counter each time the reference counter count has reached the value of 63 as determined by the AND gates 100.

Figure 4:
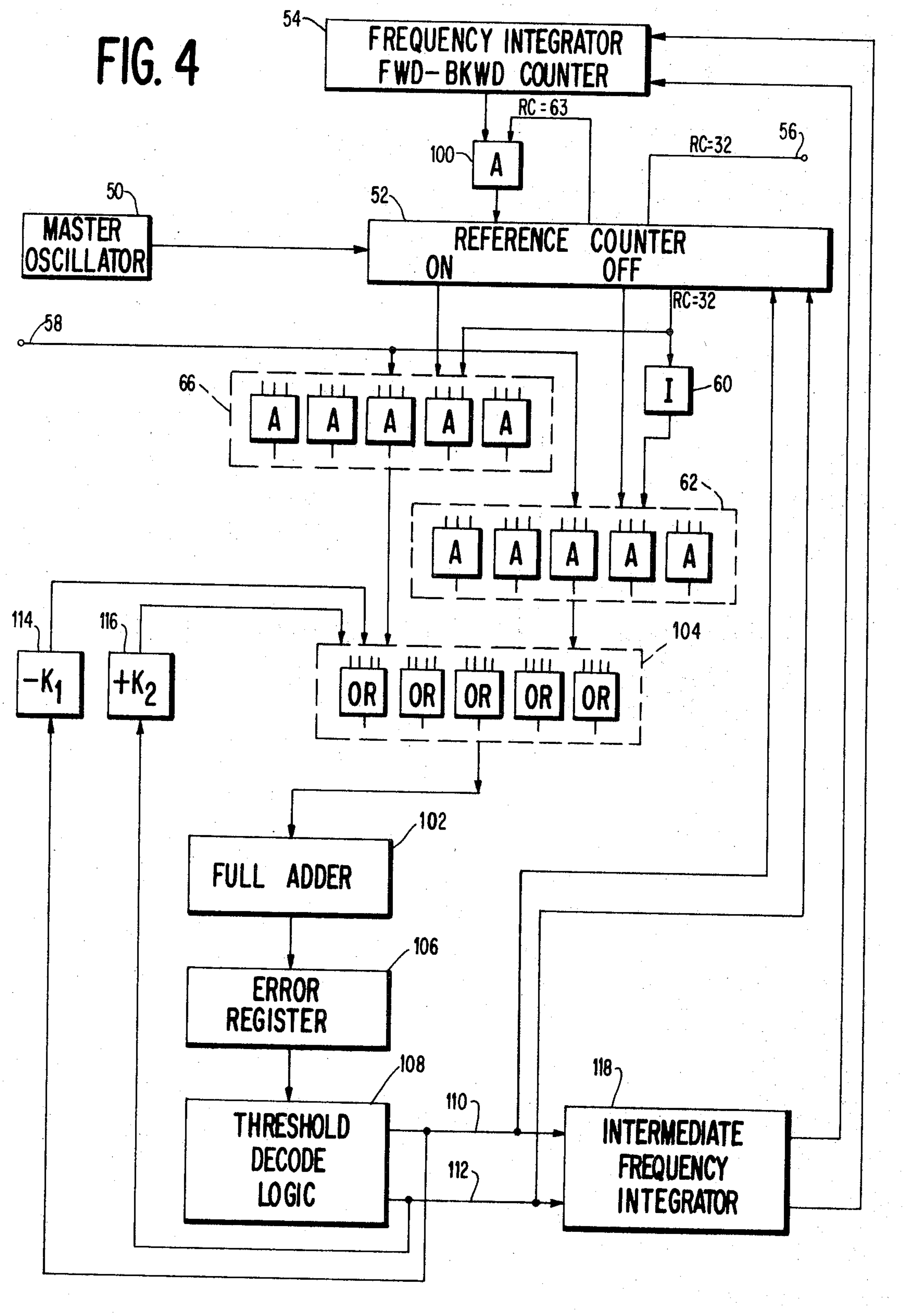
FIG. 4 is a block diagram of an all digital loop using both binary counters and adders.

An implementation of the all digital phase lock loop which utilizes both binary counters and adders is shown in FIG. 4. The operation of this loop is similar to that of the loop shown in FIG. 3 and discussed above, except that the scaler function is performed by an adder type scaler rather than by a binary counter type. The operation of the reference counter 52, the frequency integrator 54, and the phase detector comprising AND networks 62 and 66 and inverter 60 is identical to that discussed above. Since the binary adder type scaler accepts the phase error in parallel form, there is no need for a conversion from parallel to serial form using an error counter. The detected phase error is inserted into the full adder 102 via the OR network 104. The full adder 102 represents five parallel full adders in the loop shown since the five least significant bits of the reference counter are to be decoded; however, the number will vary with the center point count. The error register 106 represents five parallel latch circuits which operate in conjunction with the full adders to accumulate the detected phase errors in parallel form. The threshold decode logic circuit 108 is a conventional threshold circuit which has been set at some predetermined value. When the accumulated phase errors reach this predetermined value, the threshold decode logic circuit provides a phase correction output pulse. If the predetermined value has been exceeded in the positive direction, a positive phase correction pulse will appear on line 110; and if it is exceeded in the negative direction, a negative phase correction pulse will appear on line 112. The positive phase correction pulse on line 110 will trigger the register 114 which is stored with a predetermined negative constant. This negative constant is then added to the full adder 102 via the OR circuits 104. Similarly, a negative phase correction pulse on line 112 will trigger the register 116 which is stored with a predetermined positive constant which is added to the full adder 102 via the OR circuit 104. The lines 110 and 112 are connected directly to the reference counter 52 so that a phase correction pulse causes the reference counter to either add or subtract, depending upon whether it is a positive or negative correction, a count from the instant cycle length.

The phase correction pulses are also inserted into the intermediate frequency integrator 118. The intermediate frequency integrator accumulates the phase correction pulses for some predetermined count value and then produces a frequency correction pulse which is inserted into the frequency integrator 54. The intermediate frequency integrator could, for example, be comprised of two parallel binary counters, one for integrating the positive phase correction pulses, the other for integrating negative phase correction pulses, and by using conventional AND decode circuits, the positive or negative frequency correction pulses could be produced whenever the appropriate binary counter had reached a predetermined count value. The frequency integrator then determines at which value the reference counter will start counting as discussed above, and a change in the reference counter cycle length will cause a proportionate change in the output frequency.

The order of a phase lock loop is determined by the number of poles in the Laplace transform of the response of the loop. These poles, in turn, are determined by the number of integrators in the phase lock loop. In the loops shown in FIGS. 3 and 4, integration occurs in both the reference counter 52 and the frequency integrator 54 and thus they represent second order loops. By eliminating the frequency integrator, a first order phase lock loop can be implemented. In such a loop, only phase corrections are made to the output signal. Thus, the subject invention is considered to include an all digital simulation of a first order analog phase lock loop as well as a second order phase lock loop. Similarly, a third order loop can be simulated if the accumulation function of the scaler is emphasized.

While the invention has been particularly shown and described with reference to preferred embodiments thereof, it will be understood by those skilled in the art that various changes in form and details may be made therein without departing from the spirit and scope of the invention.

What is claimed is:

1. An all digital phase lock loop for providing clock output pulses which are synchronized with input data pulses comprising in combination: oscillator means oscillating at a frequency many times that of the input data pulses; recycling counting means for continuously counting the oscillations of said oscillator means which occur between successive input data pulses; means responsive to a predetermined count of said counting means for producing a clock output pulse at said predetermined count; means for determining the count difference between said predetermined count value and the count value of said counting means at the time an input data pulse appears; means for accumulating said count difference; means coupled to said accumulating means for producing phase correction pulses at predetermined count values of said accumulating means; means responsive to said phase correction pulses for causing said counting means to either add or subtract counts; means coupled to said accumulating means for producing frequency correction pulses at predetermined count values of said accumulating means; means for integrating said frequency correction pulses to produce a control signal; and means coupled to said integrating means and responsive to said control signal for controlling the frequency of said clock output pulses whereby said clock output pulses are synchronized with said input data pulses.

2. The apparatus of claim 1 wherein said counting means comprises a variable length binary counter having a plurality of numerically ordered binary stages, and said means for determining the count difference between said predetermined count value and the count value of said counting means at the time an input data pulse appears comprises in combination: first gate means coupled to the "on" side of said binary stages having lesser numerical significance than said predetermined count, second gate means coupled to the "off" side of said binary stages having lesser numerical significance than said predetermined count, and means responsive to said input data pulse and coupled to said first and second gate means for alternatively controlling either the first or second gate means, depending upon whether the count of said counting means is greater or lesser than said predetermined count.

3. The apparatus of claim 1 wherein said accumulating means comprises parallel full adders and latch circuits; said means responsive to said accumulating means producing phase correction pulses comprises a threshold logic circuit which produces said phase correction pulses; and said means coupled to said accumulating means producing frequency correction pulses comprises another integrating means for providing one frequency correction pulse for a predetermined number of those correction pulses derived from said threshold logic.

4. The apparatus of claim 1 wherein said accumulating means comprises a first binary counter accumulating positive values of said count differences and a second binary counter accumulating negative values of said count differences; and said means responsive to said accumulating means producing phase correction pulses comprises a plurality of AND gates coupled to each of said binary counters for producing phase correction pulses at predetermined count values of said binary counters; and said means responsive to said accumulating means producing frequency correction pulses comprises a single AND gate coupled to each of said binary counters for producing a frequency correction pulse at a predetermined count of each of said binary counters.

5. The method of synchronizing clock output pulses of an all digital phase lock loop with input data pulses comprising the steps of: continuously digitally counting in a recycling counting means the oscillations of a reference oscillator which occur between successive input data pulses; providing an output pulse at a predetermined count value of said oscillations; determining the count difference between the actual count value at which an input pulse appears and said predetermined count value; accumulating in an accumulating means the determined count differences; producing phase correction pulses at predetermined count values of said accumulating means; adding or subtracting counts from said counting means in response to said phase correction pulses; producing frequency correction pulses at predetermined count values of said accumulating means; integrating said frequency correction pulses to produce a control signal; and controlling the frequency of said clock output pulses with said control signal.

6. The apparatus of claim 1 wherein said means for controlling the frequency of said clock output pulses comprises means for controlling the cycle length of said counting means.

7. The apparatus of claim 1 wherein said means for controlling the frequency of said clock output pulses comprises means for controlling the frequency of said oscillator means.

8. The method of claim 5 wherein said controlling step comprises controlling the cycle length of said counting means.

9. The method of claim 5 wherein said controlling step comprises controlling the frequency of said reference oscillator.

References Cited

UNITED STATES PATENTS

| | | | |
|---|---|---|---|
| 3,290,611 | 12/1966 | Horlacher et al. ------ | 331—14 |
| 3,333,205 | 7/1967 | Featherston -------- | 331—10X |
| 3,364,439 | 1/1968 | Cohen et al. -------- | 331—25X |

ROY LAKE, Primary Examiner

S. H. GRIMM, Assistant Examiner

U.S. Cl. X.R.

331—17, 25